Aug. 1, 1967  A. F. SHOLL ET AL  3,333,518
SEAL COATING MACHINE
Filed Sept. 21, 1964  12 Sheets-Sheet 1

FIG. 1

INVENTORS
ARTHUR F. SHOLL
RICHARD L. STURGES
BY
W. Robert Henderson
ATTORNEY

FIG. 2A

INVENTOR.
ARTHUR F. SHOLL
RICHARD L. STURGES
BY
ATTORNEY

FIG. 3 A

INVENTORS
ARTHUR F. SHOLL
BY RICHARD L. STURGES
ATTORNEY

FIG. 4

INVENTORS
ARTHUR F. SHOLL
RICHARD L. STURGES
BY  W. Robert Henderson
ATTORNEY

Aug. 1, 1967  A. F. SHOLL ET AL  3,333,518
SEAL COATING MACHINE

Filed Sept. 21, 1964  12 Sheets-Sheet 7

INVENTORS
ARTHUR F. SHOLL
BY RICHARD L. STURGES

T. Robert Henderson
ATTORNEY

United States Patent Office 3,333,518
Patented Aug. 1, 1967

3,333,518
SEAL COATING MACHINE
Arthur F. Sholl, Omaha, Nebr., and Richard L. Sturges, Carter Lake, Iowa, assignors to Paxton-Mitchell, Omaha, Nebr., a corporation of Nebraska
Filed Sept. 21, 1964, Ser. No. 402,680
13 Claims. (Cl. 94—44)

This invention relates to the forming of an emulsified asphalt slurry and the laying of the slurry as a seal coat on a pavement or the like, and is directed particularly to a machine for forming and laying the seal coat.

It is an object of this invention to provide an improved machine for making and laying a seal coat of emulsified asphalt slurry.

It is another object of this invention to provide a readily portable, self-propelled seal coat laying machine capable of substantially rotating in a circle in place.

It is still another object of this invention to provide a small, compact, three-wheel, seal coating machine capable of laying approximately 2700 pounds of emulsified asphalt over about 100 cubic feet of hard surface at a thickness of one-quarter inch in an average of two and one-half minutes' continuous operation.

Yet another object of this invention is the provision of a seal coat laying machine wherein the hoppers for the emulsion, water, aggregate, and fines are all arranged to utilize gravity to effect a flow of their material into a mixing mill.

Still another object of this invention is to provide improved apparatus for measuring the quantity of material removed from any one or more of the hoppers, whereby an accurately proportioned mix of the materials is obtained.

It is another object of this invention to provide an improved mechanism for actually distributing the slurry over the surface to be covered.

Another object of this invention is the provision of a machine capable of attaining the above designated objectives which is economical to manufacture, simple and rugged in construction, and effective in service.

These objects, and other features and advantages of this invention will become readily apparent upon reference to the following description, when taken in conjunction with the accompanying drawings, wherein.

Referring to the drawings, the seal coat making machine of this invention comprises generally a frame 20 (FIG. 1) supported by a pair of rear wheels 21 and a bicycle-type front wheel 22, and with the frame 20 having mounted thereon a first hopper 23 for holding an aggregate, a second hopper 24 (FIG. 5) for holding emulsion, and a third hopper 26 for holding water.

The three hoppers 23, 24 and 26 are all mounted above what is commonly called a pug mill 27, whereby the matter held within the hoppers is movable into the open-top pug mill 27 by means of gravity. A fourth hopper 28 (FIG. 1) for holding fines such as cement or lime is also mounted on the machine above the pug mill 27 and opens to a small chute 29 leading to the pug mill.

Figures 6, 7, 8:
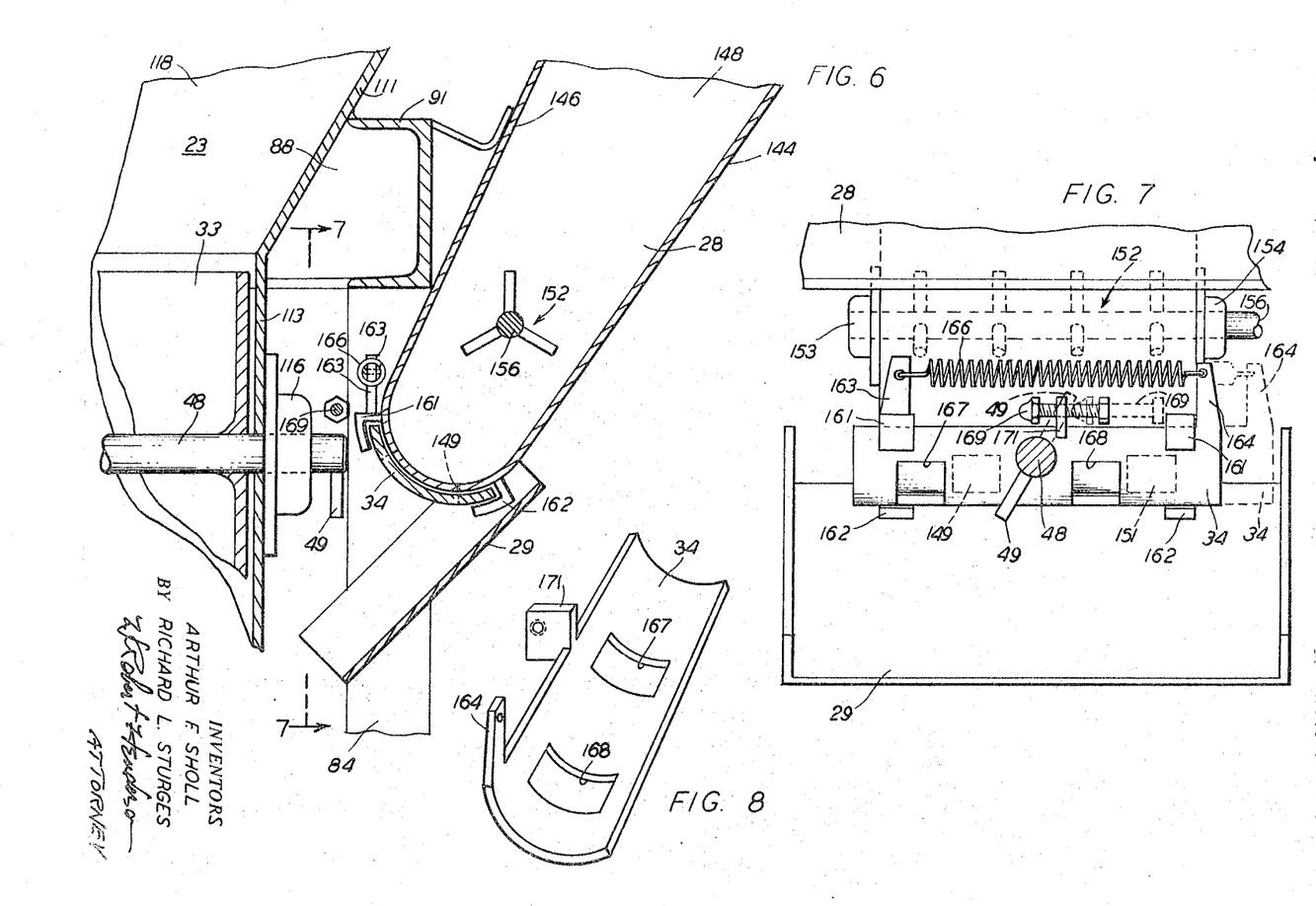
FIG. 6 is an enlarged, fragmentary, sectional view of a detail of the fines hopper measuring arrangement of FIG. 2B.
FIG. 7 is a sectional view taken along the line 7—7 in FIG. 6.
FIG. 8 is a perspective view of a shiftable element of the measuring arrangement of FIG. 6.

Each of the hoppers 23, 24 and 26 is provided with a measuring unit between the respective hopper and the pug mill 27 for transmitting a measured quantity of matter from the respective hopper downwardly into the pug mill 27. A cylindrical measuring unit 31 (FIG. 1) is provided for the emulsion hopper 24, another cylindrical measuring unit 32 for the water hopper 26, and an open-top rotatable drum 33 of a predetermined size is provided for the aggregate unit 23. To measure the amount of fines from the fines hopper 28, a transversely shiftable plate 34 (FIGS. 7 and 8) is provided, the operation of which will be described hereinafter.

The measuring units are all operated by fluid controlled means operably connected thereto. A pair of conventional hydraulic piston and cylinder units 36 and 37 (FIG. 1) are mounted at their bases to stationary elements of the frame 20, with their piston rods 38 and 39, respectively, inserted into for operating the respective measuring units 31 and 32. Another piston and cylinder unit 41 (FIG. 4) is pivotally mounted at one end 42 to a frame element 43, with the rod 44 having a ratchet 46 secured thereto in constant meshed engagement with a ratchet wheel 47 secured to one end of the shaft 48 of the drum 33 (see also FIG. 2A). The opposite end of the shaft 48 has a projection 49 (FIGS. 2B and 6) operable upon the fines plate 34.

Figure 4:
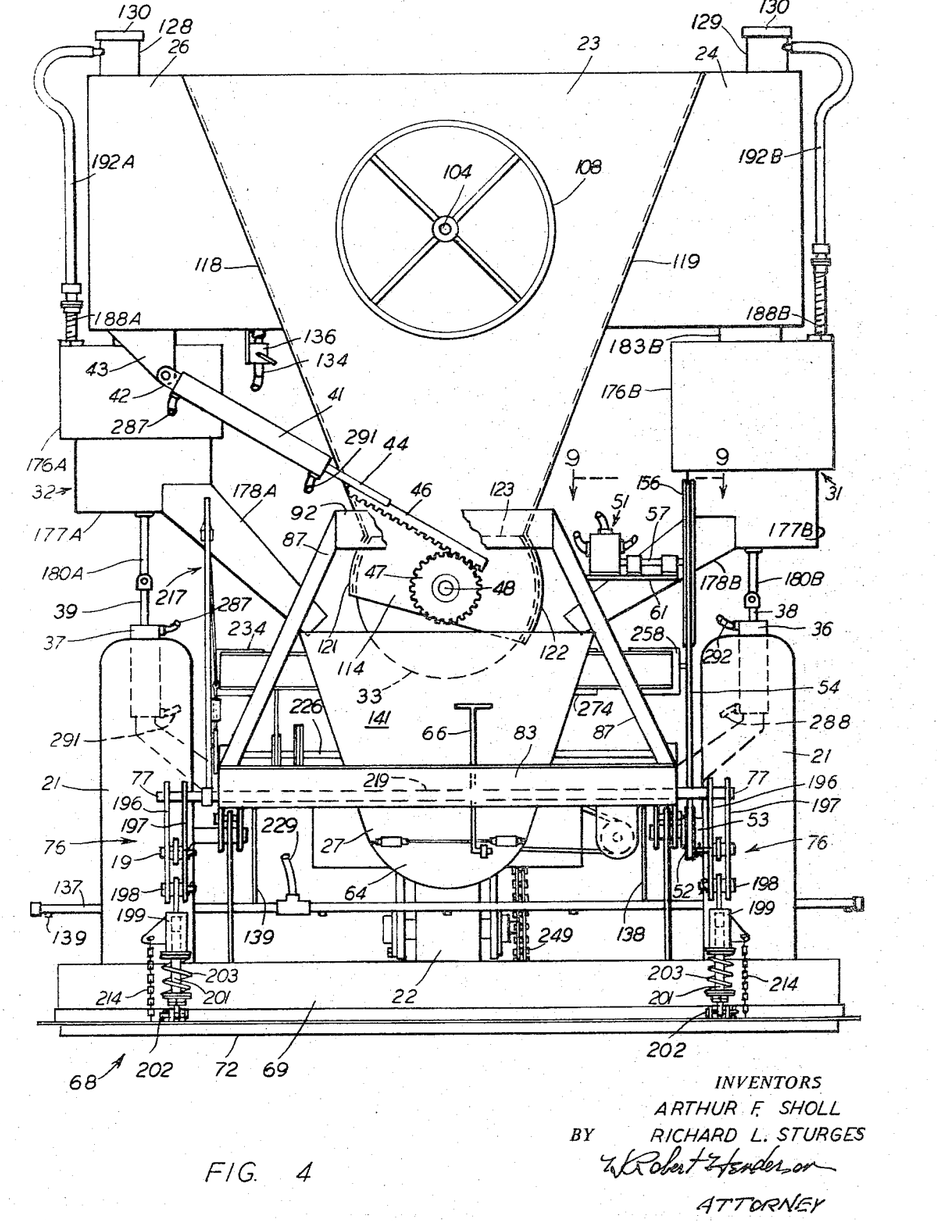
FIG. 4 is a rear elevational view of the machine, with certain parts broken away for clarity of illustration.
Figures 9, 10:
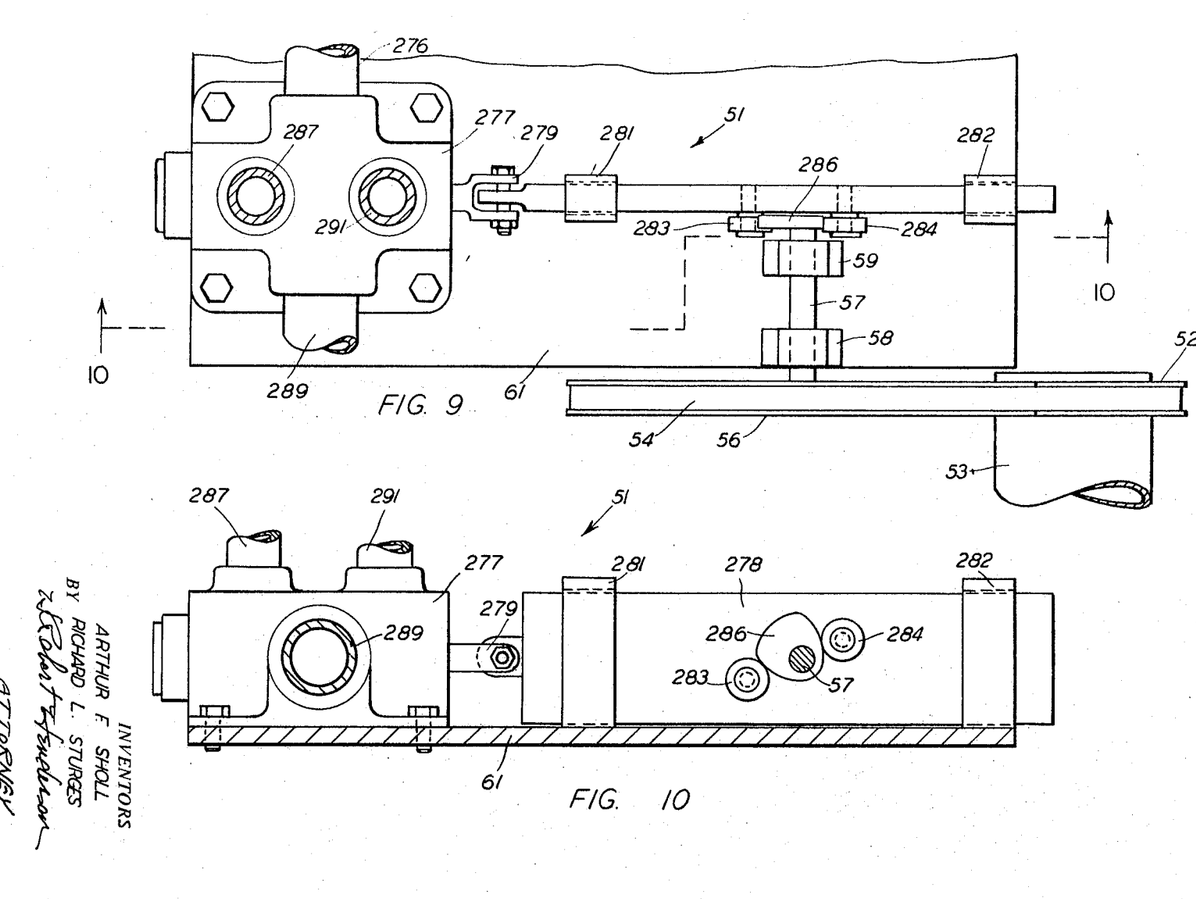
FIG. 9 is an enlarged fragmentary plan view of a cam valve unit operable off a wheel axle.
FIG. 10 is an enlarged fragmentary sectional view taken along the line 10—10 in FIG. 9.

To selectively actuate the various fluid controlled units 36, 37 and 41, a valve unit 51 (FIGS. 9 and 10) is provided, and which is operable by means of a pulley wheel 52 (FIG. 4) secured to a rear wheel axle 53. A belt 54, rotated by the wheel 52, rotates in turn a larger wheel 56 (see FIG. 9) supported on a shaft 57 rotatably mounted in a pair of bearing mounts 58 and 59 secured to a frame-mounted plate 61 (FIG. 4). As described more in detail hereinafter, operation of the valve unit 51 selectively actuates the fluid controlled units 36, 37 and 41 to effect operation of the measuring units in a timed relationship.

During the pre-selected gravitational flow of the materials from the four hoppers 23, 24, 26 and 28 into the pug mill 27 in measured quantities, the mill 27 operates continuously to mix the materials into a slurry of an evenly mixed consistency by means of a shaft 62 (FIGS. 2A and 2B) having a plurality of radially extended fingers 63 (FIGS. 2 and 5) secured thereto. A gate 64 (FIG. 4) is hingedly connected to the rear of the pug mill 27 for upward swinging movement from a closed position to an open position (see FIGS. 2A and 3A). A lift rod 66 is provided for the gate 64, whereby the operator standing on the rear platform 67 can easily control the opening and closing of the gate 64.

From the pug mill 27, the slurry is dumped through the open gate 64 into a squeegee assembly, indicated generally at 68 in FIGS. 2A, 3A, 4 and 11. The squeege assembly includes an open rectangular box frame 69 (FIG. 11) with a rectangular rubber insert 71 secured to the inner surface thereof, and the lower edge 72 of which engages the surface of that which is being sealed. A pair of skid members 73 with upturned front edges 74 (FIGS. 11 and 2A) are provided for smoothly sliding the box frame 69 over a surface. The squeegee frame 69 is pressed, when in use, downwardly by means of an articulated mechanism 76 (FIG. 11) pivotally connected at 77 and 78 to the machine frame 20. This mechanism will be described in detail hereinafter.

More specifically, the frame 20 is generally of a rectangular shape, having two levels. The lower level includes a pair of parallel, longitudinally extended beams 79 and 81 (FIGS. 1 and 3), interconnected at their front and rear ends by a pair of transverse beams 82 and 83, respectively. The upper level is supported by three pair of inclined braces 84 (FIGS. 1 and 3B), 86 (FIGS. 2A and 3B), and 87 (FIGS. 3A and 4), with the upper level including a rectangular frame, smaller than the lower level, of longitudinal supports 88 and 89 (FIG. 2) and front and rear supports 91 and 92. The frame 20 also includes on the lower level a transverse beam 90 (FIG. 3B) between the beams 79 and 81 to aid beam 82 in supporting a gasoline powered engine 95.

To support the front wheel 22, a pair of channel beams 93 and 94 (FIGS. 1, 2B, and 3B) are secured at their outer ends to the junction of the beams 79 and 81 with 82, and are inclined upwardly for securement with a centrally disposed brace unit indicated generally at 96. A fork 97 (FIG. 1) has its upper end rotatably mounted in a spindle 98 secured to the brace unit 96, and with a steering column 99 extended upwardly and supported by a bearing unit 101.

A bevel gear 102 (FIG. 2B) on the column 99 meshes with another bearing mounting supported bevel gear 103. The shaft 104 of the gear 103 extends rearwardly through front and rear mountings 106 (FIG. 2B) and 107 (FIG. 2A), respectively, mounted on the aggregate hopper 23 to a rear-mounted steering wheel 108 above the platform 67. By this arrangement, the operator can turn the front wheel 22 as he desires, and with the wheel 22 turnable substantially 90°, the operator can effect a turning of the machine almost in place.

Figure 2A:
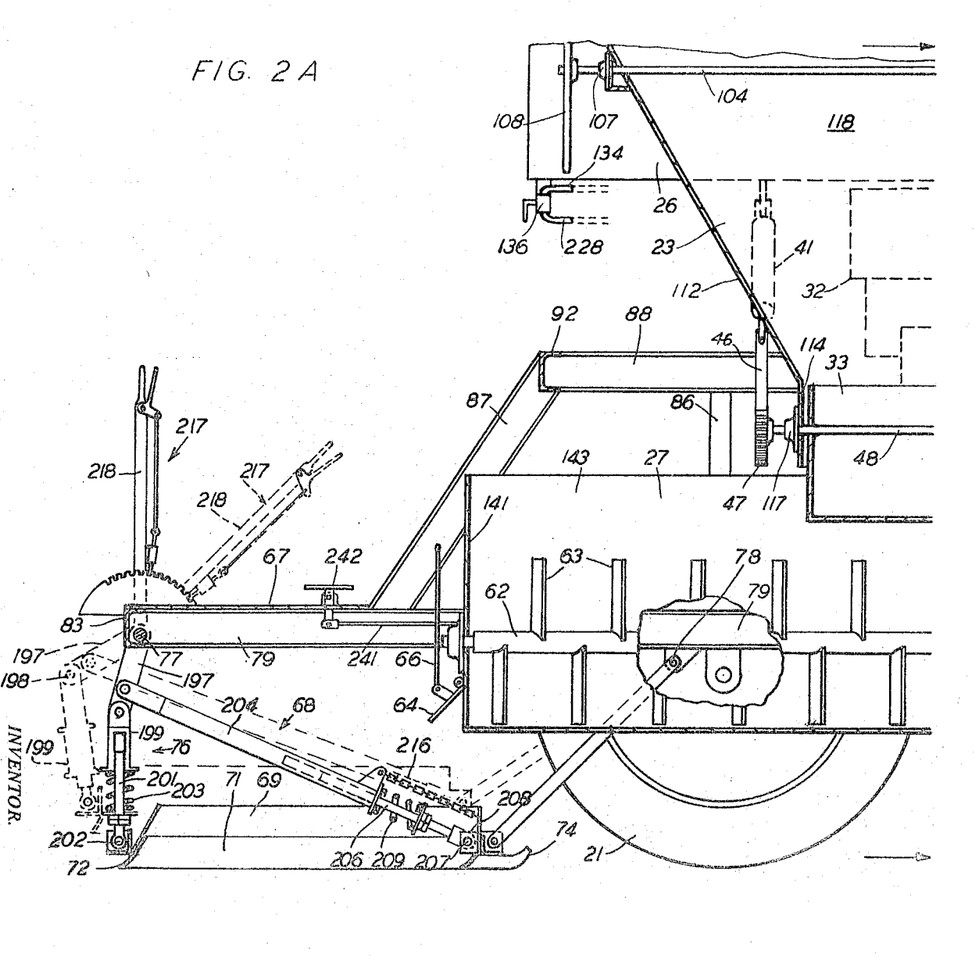
FIGS. 2A and 2B comprise a vertical sectional view taken along the longitudinal center of the machine, certain parts broken away and others shown in alternate positions for clarity of illustration, FIG. 2A showing the rear of the machine and FIG. 2B showing the front thereof.
Figure 2B:
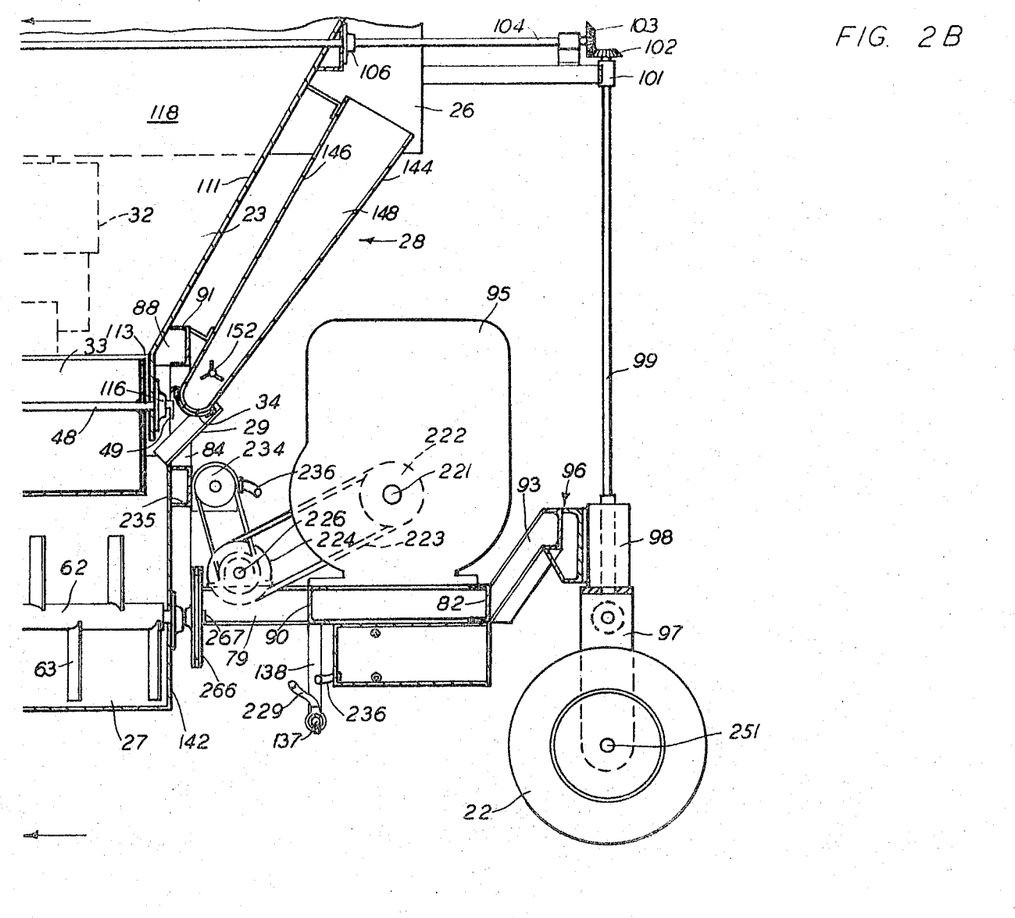
Figures 5, 5A:
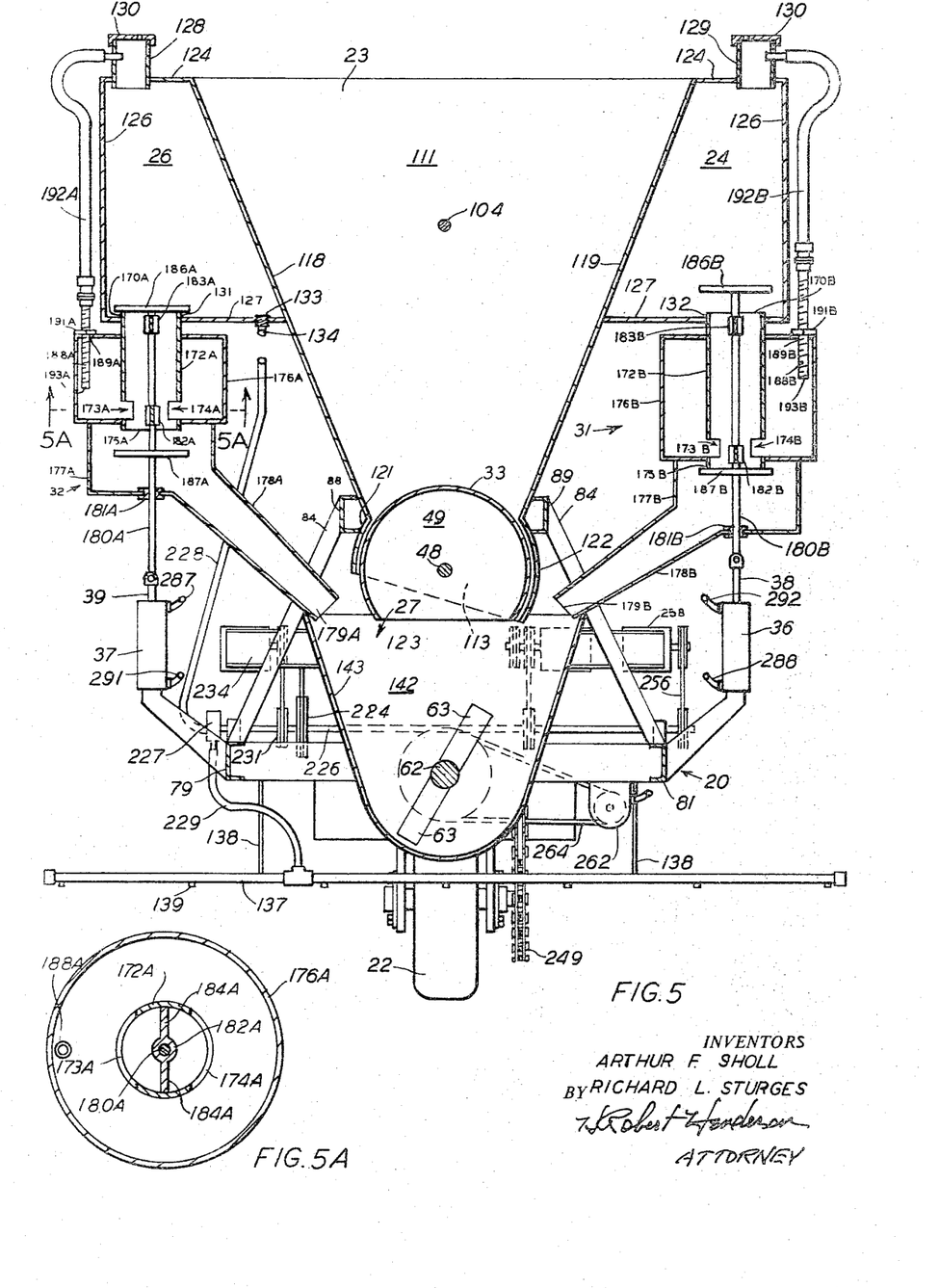
FIG. 5 is a vertical transverse sectional view taken along the line 5—5 in FIG. 3B.
FIG. 5A is an enlarged sectional view taken along the line 5A—5A of FIG. 5.

The aggregate hopper 23 is best shown in section in FIGS. 2 and 5, and includes a front straight panel 111 (FIG. 2B) and a rear straight panel 112 (FIG. 2A), both panels 111 and 112 wider at the top than bottom and inclined downwardly in a converging manner until their lower flanges 113 and 114 depend straight to provide for mountings 116 and 117 for the dump shaft 48. Likewise, the side panels 118 and 119 (FIG. 5) are straight, taper from top to bottom—see the fragments thereof in FIG. 3A, and incline toward each other. Their lower flanges 121 and 122 (FIG. 5) are curved, however, to form a complementary surface with the cylindrical curvature of the drum 33.

The flange 122 is longer than flange 121 to provide a longer period of retaining the drum opening 123 closed so as to prevent a by-pass of unmeasured aggregate through the drum 33 while it rotates from the closed position (FIG. 4) clockwise as viewed to the open position (FIG. 5).

Figure 12:
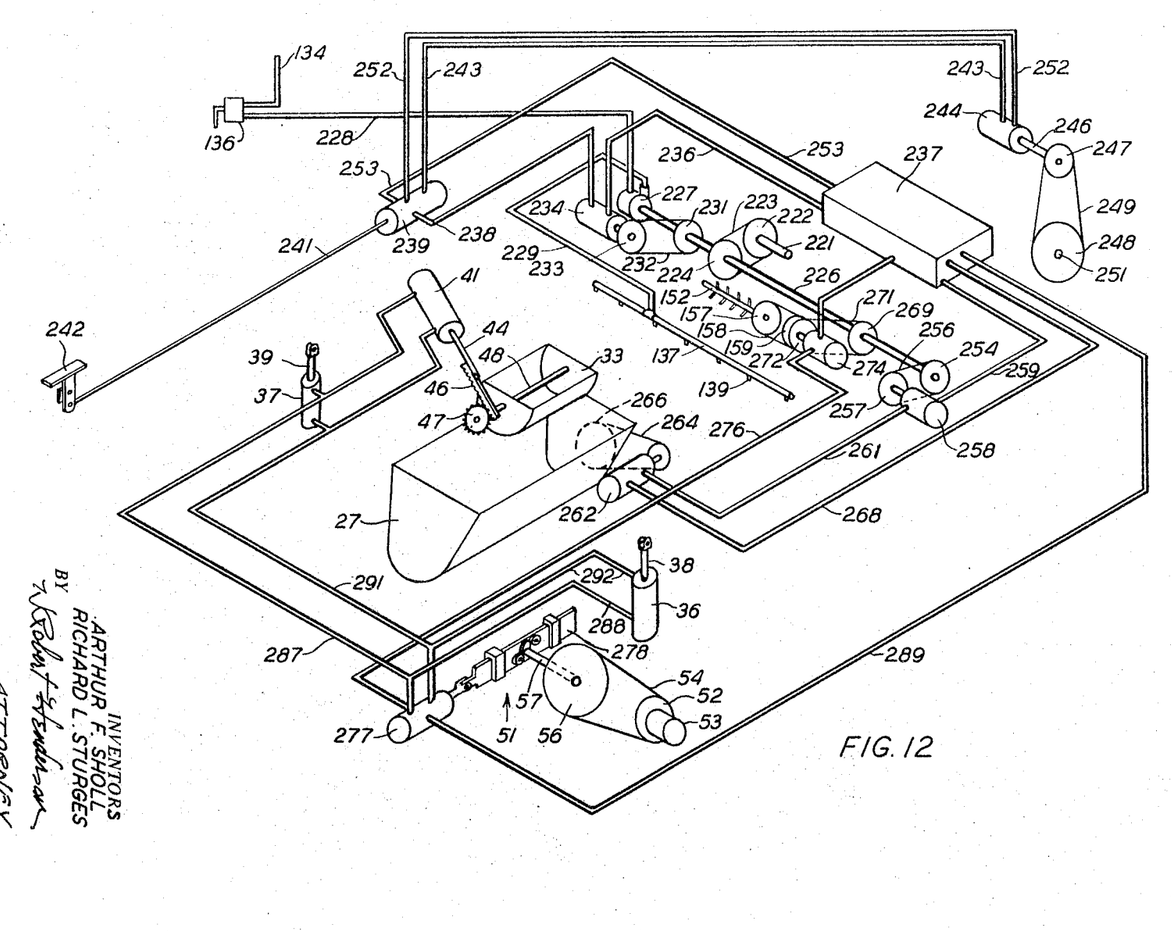
FIG. 12 is a diagrammatic view of the hydraulic circuit of the machine, and certain parts associated therewith.

The emulsion hopper 24 and the water hopper 26 are best illustrated in FIG. 5. They are enclosed tanks by means of upper panels 124, side panels 126, the respective panels 118 and 119 of the aggregate hopper 23, and bottom panels 127. Both hoppers 26 and 24 are provided with filler necks 128 and 129 with vented caps 130, and both have openings 131 and 132 provided in their bottom panels 127 for connection with their respective measuring units 32 and 31. It will be noted the water hopper 26 has a fluid connection 133 and conduit 134 which leads to a valve 136 (FIG. 4) adapted for operation by the operator while standing on the platform 67. As explained more in detail when the hydraulic circuit of FIG. 12 is described, the valve 136 controls the supply of water to a spray bar 137 (FIGS. 1, 2B, and 3B) mounted by straps 138 to the frame beam 90. A plurality of transversely spaced nozzles 139 (FIG. 1) direct the water in a spray effect onto the surface in front of the squeegee assembly 68 to aid the application of the slurry.

The pug mill 27 is an open top container having straight vertical walls 141 (FIG. 2A) and 142 (FIG. 2B) and a single base wall 143 (FIG. 5) of a V-shape with the apex rounded out to accommodate the rotating fingers 63. As best shown in FIGS. 2A and 2B, the pug mill 27 encloses the length of the aggregate drum 33, and as shown in FIG. 5, the width thereof. The drum 33 is the measuring unit for the aggregate hopper 23 in that the drum 33 is constructed to hold when full a predetermined amount of aggregate, and to transfer same into the pug mill 27 upon rotation.

The fines hopper 28 and measuring apparatus are best shown in FIGS. 2B, and 6–8. In particular, the hopper 28 includes an open top container having a front 144, back 146, and sides 147 and 148, with the bottom thereof rounded and having a pair of openings 149 and 151 (FIG. 7) formed therein. A fluffer 152 is rotatably mounted by a pair of bearing mounts 153 and 154 within the fines hopper 28 for maintaining the fines in a proper consistency. The shaft 156 of the fluffer 152 is attached to a pulley 157 (FIG. 1) which is driven by a belt 158 and another pulley 159.

A pair of curved keepers 161 and 162 (FIG. 7) are mounted at each end on the bottom of the fines hopper 28 for reciprocally holding the fines plate 34 (FIGS. 6 and 8) below the bottom. An upstanding lug 163 is secured to the upper keeper 161 of one pair. The plate 34 also has an upstanding lug 164, interconnected with the stationary lug 163 by a spring 166 whereby the plate 34 is biased to the left as viewed in FIG. 7 until the lug 164 engages the upper right keeper 161. The plate 34 has a pair of transversely spaced openings 167 and 168 adapted upon movement of the plate to the right as viewed in FIG. 7, to register with the openings 149 and 151 in the bottom of the fines hopper 28.

Such registration of the respective openings is provided by rotation of the drum 33 from its up position to its dump position, whereby the projection 49 (FIGS. 6 and 7) engages a bolt device 169 threadably secured to a block 171 secured to the plate 34. The plate is moved thereby from the full line position of FIG. 7 to the dotted line position thereof, whereupon the registered openings 149 and 151, and 167 and 168 permit the fines to pass from the hopper 28 through the chute 29 and into the pug mill 27 (FIG. 2B). Upon a return rotation of the drum shaft 48, the counterclockwise rotation of the projection 49 (FIG. 7) permits the spring 166 to return the plate 34 to its closed position.

Thus, the amount of fines measured through is in direct proportion to the amount of aggregate dumped by the drum 33, and the length of time the drum 33 remains in the dump position (FIG. 5). A variation is provided, however, as to the metering of the fines, by the threaded nature of the bolt device 169. This provides for varying the registration of the openings 149, 151 and 167, 168 from full to a lesser degree, and thus provides for restricting the flow of fines to a predetermined degree.

Referring now primarily to FIGS. 5 and 5A, the measuring units 32 and 31 for the water hopper 26 and the emulsion hopper 24 are shown in cross-section. These units are identical, except that the unit 31 is slightly larger as illustrated, and therefore only one unit, 32 for example, will be described. The elements of the unit 32 will be numbered with an A subscript, and the elements of the unit 31 with a B subscript.

The measuring unit 32 includes a cylinder 172A secured as by welding to the bottom panel 127 of the water hopper 26, and with the upper end 170A thereof inserted through the opening 131. A pair of arcuately spaced openings 173A and 174A (FIG. 5A) are formed in the cylinder at the base thereof and open into the interior of a circular housing 176A both the top and bottom of which are secured about the cylinder 172A.

The bottom open end 175A of the cylinder opens into the upper end 177A of a chute 178A the lower end 179A of which extends over and toward the pug mill 27. It will be noted that an extension 180A pivotally connected to the rod 39 of the piston and cylinder unit 37 extends upwardly through a seal 181A in the chute end 177A, and also through a pair of bearings 182A and 183A each formed axially of the cylinder by a pair of radial arms 184A (FIG. 5A). A flat, circular closure plate 186A is secured to the upper end of the rod extension 175A, and adapted to close over the cylinder's upper end 170A, and another such plate 187A is secured to the rod extension 175A for closure, when the upper plate 186 is off the cylinder's upper end 170A, over the bottom end 175A thereof.

Thus, in the position of the rod 39 of FIG. 5, the cylinder 172A is closed off from the water hopper 26 and is open through its end 175A to the chute 178A. The housing 176A is also open, therefore, to the chute 178A. Without further structure, it can be plainly seen that upon an opening of the closure plate 186A, with a concurrent closing of the plate 187A, water would flow by gravity downwardly through the cylinder 172A, outwardly through the openings 173A and 174A, filling thereby the housing 176A. Then upon a closing of the upper plate 186A as illustrated in FIG. 5, and a concurrent opening of the plate 187A, all of the water between the two plates 186A and 187A, in effect, would flow downwardly through the chute 178A and into the pug mill 27.

To vary the amount of fluid displaced from the hopper 26, so as to provide a manually determined and adjustable metering, a tube 188A is threaded through an opening 189A formed in the upper wall of the housing 176A, and with a nut 191A for adjusting the length of the tube 188A within the housing 176A. A flexible conduit 192A is coupled to the upper, exposed end of the tube 188A, and is inserted into the interior of the filler neck 128, the tube 188A thereby being open to the atmosphere. Thus, upon a filling of the housing 176A, the water will fill only up to a level within the housing where the inner end 193A of the tube 188A is covered.

As the air trapped within the housing 176A is incompressible, for practical purposes, the housing 176A will not accept further fluid from the hopper 26, via the cylinder 172A. Therefore, upon a closing of the plate 186A, only the predetermined fluid within the cylinder 172A and the housing 176A is transmitted through the chute 178A to the pug mill 27. It may readily be appreciated that by threading the tube 188A upwardly or downwardly so as to vary its spacing from the bottom of the cylinder 176A, the amount of fluid withdrawn from the hopper 26 can be varied.

Figure 3A:
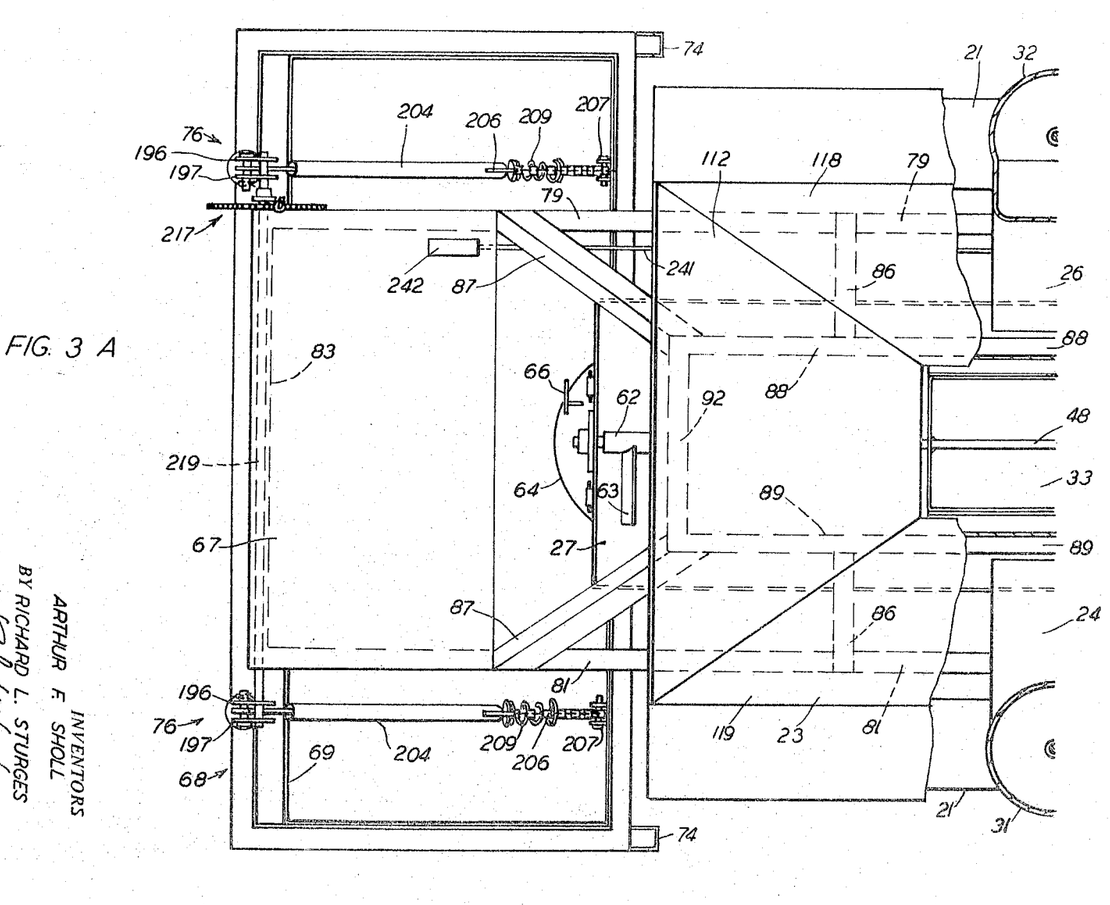
FIGS. 3A and 3B comprise a top plan view of the machine, with FIG. 3A showing the rear and FIG. 3B showing the front of the machine, certain parts broken away, and others shown in section, phantom and dotted lines to clarify the illustration.
Figure 11:
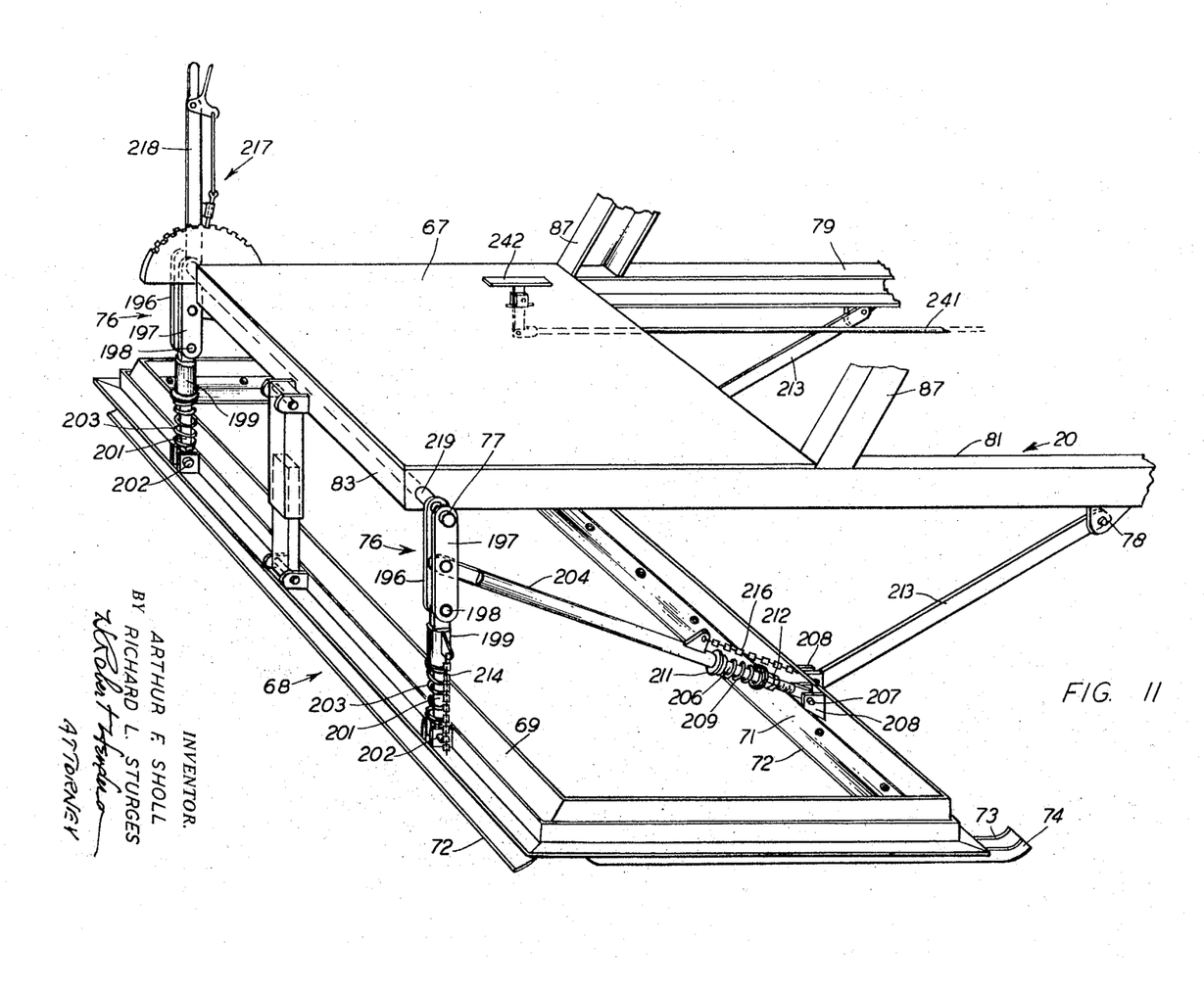
FIG. 11 is an enlarged, fragmentary, perspective view of the rear-mounted squeegee unit of this invention.

Referring now particularly to FIGS. 2A, 3A, and 11, the pairs of articulated mechanism 76 for depressing the squeegee frame 69 is best illustrated. As the mechanisms are identical, only one will be described with like elements designated by like reference numerals. The mechanism includes a pair of parallel bars 196 and 197 pivotally connected at 77 to the frame 20 and at 198 to the upper end of a sleeve 199. A free end of a plunger 201 is telescopically inserted into the open lower end of the sleeve 199, with the lower plunger end pivotally connected by a pin 202 to the box frame 69. A spring 203 is compressed between the lower end of the sleeve 199 and the lower end of the plunger 201 to continually bias the latter, and thus the box frame 69 downwardly.

Intermediate the ends of the bars 196 and 197, a strut 204 is pivotally connected, with the opposite end thereof telescopically receiving another plunger 206. The plunger 206 is pivotally connected at its lower end by a pin 207 to a pair of ears 208 integral with the box frame 69. A compression spring 209 is placed between a collar 211 at the lower end of the strut 204, and a nut 212 threaded on the plunger 206. A pair of braces 213 pivotally connect the front edge of the squeegee frame 69 to the machine frame 20 at the pivot points 78. Chains 214 and 216 interconnect each sleeve 199 and strut 204, respectively, with the frame 69 to prevent the plungers 201 and 206 from pulling out.

To adjustably raise and lower the squeegee frame 69, a conventional hand operated pawl and ratchet unit 27 (FIG. 11) is provided. The lower end of the handle 218 thereof is secured to a bar 219 which extends transversely of the platform 67, through the frame beams 79 and 81, and the ends 77 of which provide solid connections with each pair of bars 196 and 197. Thus, upon manipulation of the ratchet unit 217, the squeegee frame can be lifted up to the dotted line position of FIG. 2A, where it is disengaged from the road or other surface, and it can be lowered to the road surface engaging position, wherein the frame 69 is depressed by means of the springs 203 and 209.

Figure 1:
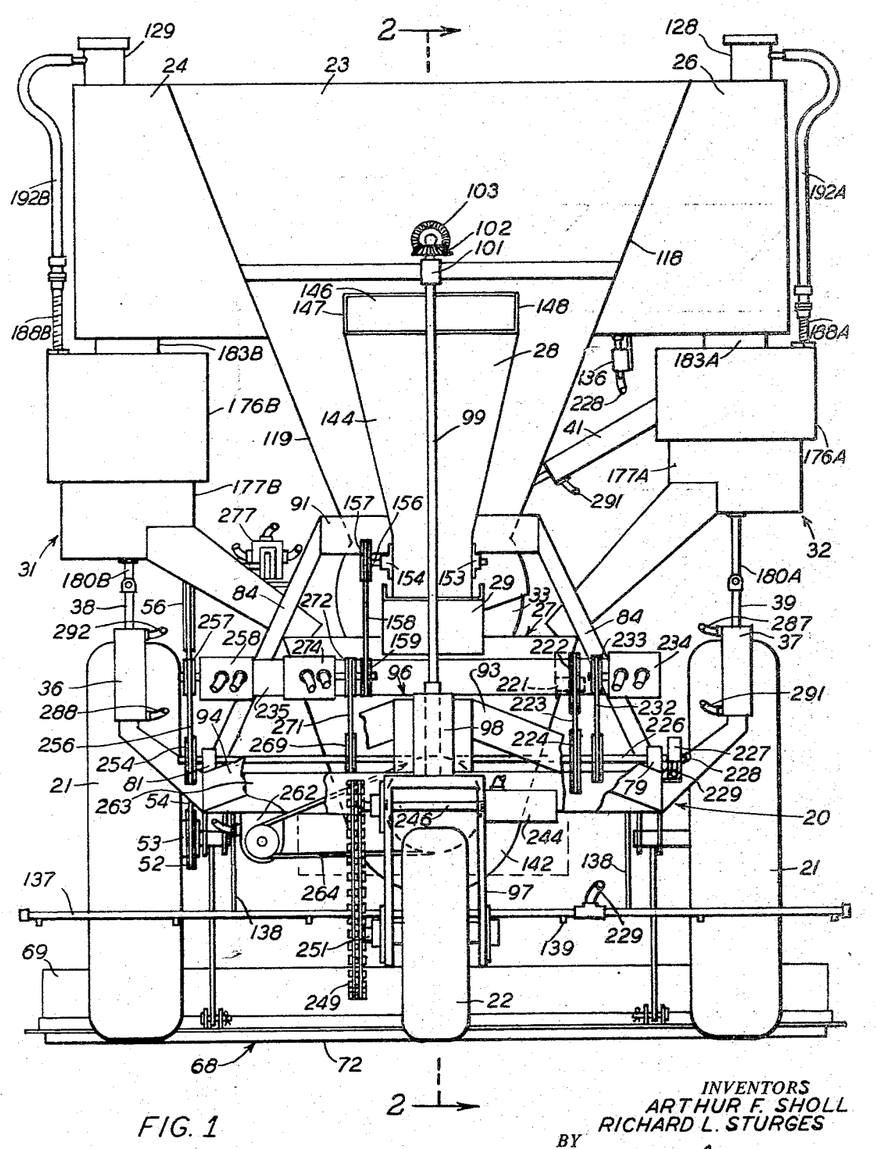
FIG. 1 is a front elevational view of a preferred embodiment of the slurry seal coat laying machine of this invention, certain parts broken away for clarity of illustration.
Figure 3B:
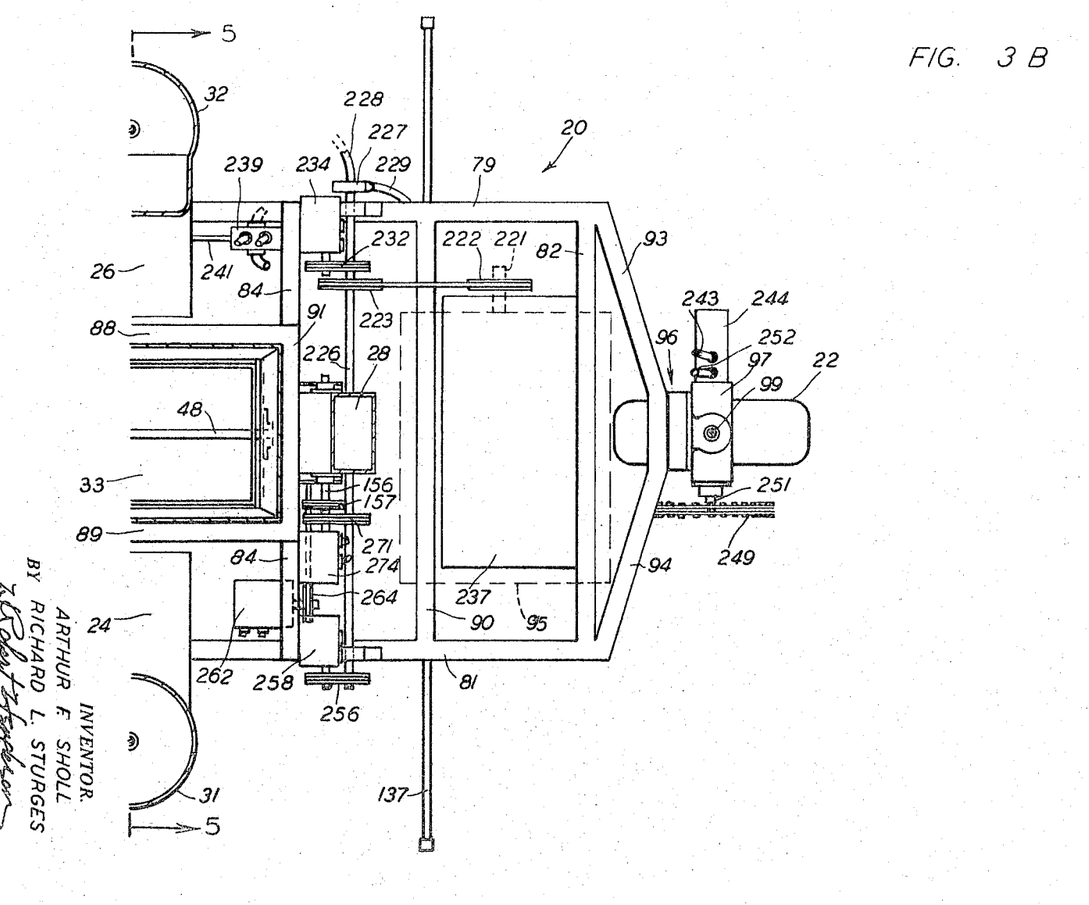

As mentioned hereinbefore, a gasoline powered engine 95 (FIG. 2B) is provided, and it will now be described as to the utilization of this power to operate the machine. Power is taken from the engine stub shaft 221 by a wheel 222 and belt 223 to another wheel 224 secured to a transverse shaft 226 (FIGS. 3B and 12). Referring to FIG. 1, at the right end of the shaft 226, a water pump 227 is operated thereby, to receive water through a conduit 228 (FIG. 12) from the valve 136, and to force the water through another conduit 229 to the spray bar 137.

On the inside of the water pump 227, a pulley wheel 231 (FIGS. 1 and 12) is mounted for driving, via a belt 232 and another wheel 233, a fluid pump 234. This pump 234 mounted on a channel beam 235 (FIG. 2B) is fluid connected by a supply line 236 to a fluid reservoir 237 (see FIG. 2B), and is operable to force the fluid through a conduit 238 (FIG. 12) to a control valve 239. The latter is positioned by a rod 241 connected at the rear of the machine by a pedal 242 (FIG. 2A) mounted on the platform 67. In one position of the valve 239, fluid is transmitted through a line 243 (FIG. 12) to a reversible fluid motor 244 mounted on the front wheel fork 97 (FIG. 1).

The rotation of the motor 244 is transmitted through a shaft 246, and via a pair of sprocket wheels 247 and 248, and a chain 249 to the front wheel axle 251, thus effecting rotation of the wheel 22 in one direction. The fluid is returned from the motor 244 to the valve 239 by line 252. To reverse the direction of rotation of the front wheel 21, the operator manipulates the foot pedal 242 to reverse the flow of fluid through the lines 243 and 252; and should no power be desired transmitted to the motor 244, the valve 239 is positioned to by-pass the fluid through a line 253 to the reservoir 237.

On the opposite end of the shaft, a pulley wheel 254 (FIGS. 1 and 12) rotates a belt 256 and another wheel 257 for operating another fluid pump 258 mounted on the beam 235. Connected to the reservoir 237 by a line 259, the pump forces the fluid under pressure through a line 261 to a fluid motor 262 secured to a transverse frame member 263 (FIG. 1). Rotation of the motor 262 is transmitted by a belt 264 to a pulley wheel 266 (FIG. 2B) secured to the exterior stub 267 of the pug mill shaft 62, thus effecting a rotation of the pug mill shaft 62. A return line 268 is provided between the motor 262 and the reservoir 237.

Adjacent the wheel 254 and inwardly thereof is another pulley wheel 269 (FIGS. 1 and 12) connected by a belt 271 to one of a pair of wheels 272 and 159, both of which are mounted on the shaft of a pump 274. The wheel 159 in turn rotates the belt 158 extended upwardly to the wheel 157 for the fines hopper fluffer 152.

Before describing further, it should be noted herein that in response to operating the engine 95, fluid power is immediately made available at the front wheel motor 244 to rotate same in either direction so as to move the machine forward or backward, and the fluid is utilized to immediately effect rotation of the pug mill shaft 62 and the fines hopper fluffer 152.

From the pump 274 (FIG. 12), fluid is transmitted through a line 276 to the conventional three position valve 277 of the valve unit 51, which valve 277 is positioned by a reciprocating slide member 278 pivotally connected thereto at 279, the member 278 reciprocal through a pair of hangers 281 and 282. A pair of rollers 283 and 284 (FIG. 10) are mounted on one side of the member 278 for engagement by a cam 286 secured to the axle rotated shaft 57. By this arrangement, in response to rotation of the axle 53 due to movement of the machine, the member 278 is reciprocated at a predetermined rate, depending upon the ratio of the two pulleys 52 and 56, and moves the valve 277 through a first position, a neutral position, and a third position.

In the first position, fluid under pressure is transmitted through line 287 (FIG. 12) to the cylinder units 27 and 41, and through line 288 to the cylinder unit 36. At the unit 37, the rod 39 and its extension 180A (FIG. 5) are pulled down, dumping a measured quantity of water into the pug mill 27. At the unit 41, the ratchet 46 is extended to rotate the drum 33 to the dump position, dumping a measured quantity of aggregate into the pug mill 27. Simultaneously, the fines plate 34 (FIG. 6) is reciprocated, dumping a predetermined amount of fines into the pug mill 27. At the unit 36, the rod 38 and the extension 180B (FIG. 5) are extended to close the lower closure plate 187B, and raise the upper plate 186B, whereby to charge the measuring unit 31 with a predetermined quantity of emulsion.

When the valve 277 has been placed in the third position, passing through neutral where the fluid is merely by-passed to the reservoir through line 289 (FIG. 12), the fluid is transmitted through line 291 to the units 37 and 41, and through line 292 to the unit 36. At the unit 37, the rod 39 and its extension 180A are raised to charge the unit with another quantity of water. At the unit 41, the ratchet 46 is retracted to rotate the drum 33 to a recharge position, the fines plate 34 being reciprocated to a closed position. At the unit 36, the lower closure plate 187B is opened to dump a measured amount of emulsion into the pug mill 27. The pug mill 27 is continuously being operated in that the shaft 62 and fingers 63 are rotating, thus when the operator desires he can open the gate 64 to permit the discharge of the slurry into the squeegee assembly 68. As the tension of the belt 54 (FIG. 9) is somewhat slack, the operator can manipulate the wheel 56 by hand, independent of movement of the machine.

Figure 13:
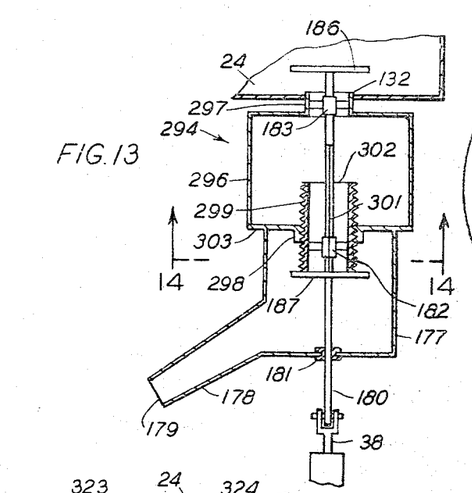
FIG. 13 is a sectional view of a modified measuring unit for either of the side hoppers shown in FIG. 5.
Figure 14:
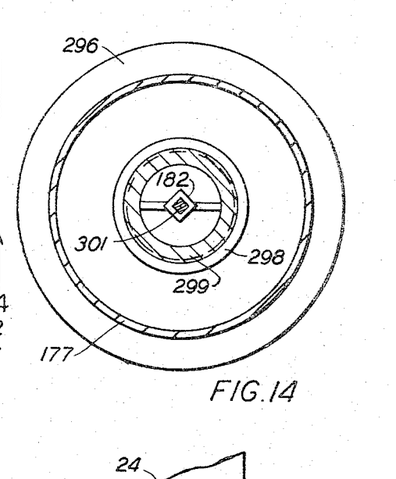
FIG. 14 is an enlarged sectional view taken along the line 14—14 in FIG. 13.

Referring now to FIGS. 13 and 14, a modified version 294 of the measuring units 31 and 32 is illustrated, with like parts indicated by like reference numerals. The measuring unit 294 comprises a cylindrical housing 296 having an upper neck 297 and a lower, internally threaded neck 298. The housing 296 is joined below the neck 298 by the upper end 177 of the chute 178, the lower end 179 of which is adapted to discharge the emulsion, for example, into the pug mill 27.

To vary the amount of material discharged into the pug mill 27 upon an opening movement of the lower closure plate 187, and to thereby provide an accurately measured discharge, an externally threaded cylinder 299, open at both ends, is threaded into the lower neck 298. The rod extension 180 again extends upwardly through the seal 181, and a pair of bearings 182 and 183 supported by the spider structure mounted respectively in the cylinder 299 and neck 297. The closure plate 186 is adapted to move over the upper surface of the neck 297 to close and open same, and the plate 187 moves similarly relative to the lower end of the cylinder 299. The extension 180 is squared at 301 within a squared bearing 182 to permit rotation of the cylinder 299 within the neck 298 by rotating the rod 180 at a location thereon exterior of the housing 296 and the chute 177.

In the position of the closure plates 186 and 187 in FIG. 13, the emulsion material flows by gravity through the upper neck 297 and into the cylinder 299 and the housing 296, filling these elements entirely—depending upon the closure plates remaining in their illustrated positions sufficiently long. Then, in response to operation of the piston and cylinder unit 36 to lower the extension rod 180, thereby opening the closure plate 187 and closing the plate 186, the fluid within the cylinder 299 and the housing 296 flows out through the chute 178 until the fluid within the housing reaches a level even with the upper inner end 302 of the cylinder 299.

Thus, it can be readily appreciated that by threading the cylinder 299 inwardly or outwardly of the neck 298— via the extension rod 180, whereby to space the inner end 302 a predetermined distance above the bottom wall 303 of the housing 296, the quantity of material discharged thereby is accurately and adjustably measured. It will be understood that although but one modified version 294 is illustrated, a pair thereof would be substituted for the units 31 and 32, with the extension rods 180 and closure plates operating exactly as described for the units 31 and 32.

Figure 15:
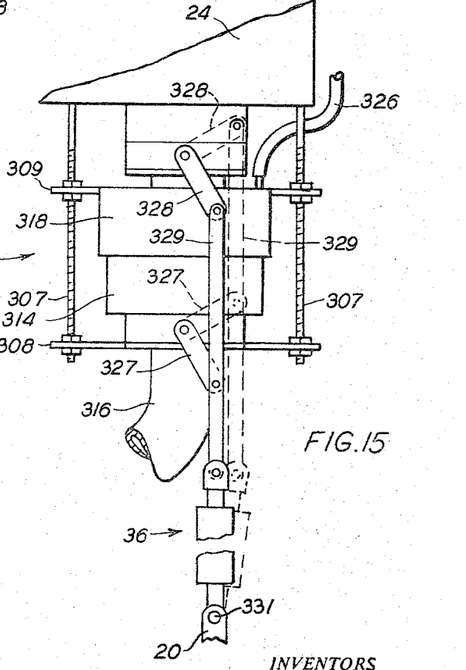
FIG. 15 is an elevational view of another modified measuring unit.
Figure 16:
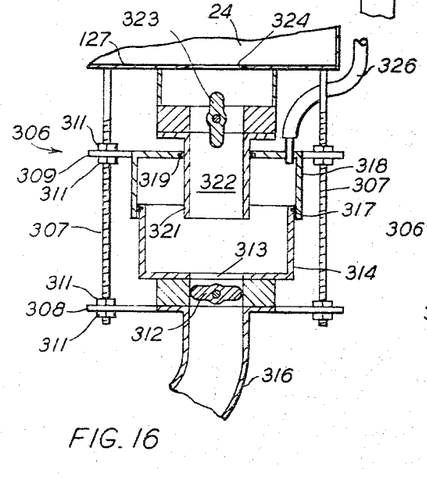
FIG. 16 is a vertical sectional view taken substantially along the vertical axis of the modified structure of FIG. 15.

Referring now to FIGS. 16 and 17, a second modified version 306 of the measuring units 31 and 32 is illustrated. A plurality of threaded support rods 307 are secured to the bottom panel 127 of the emulsion hopper 24, and support a base plate 308 and a top plate 309 by means of lock nuts 311, each plate being movable relative to the other.

The base plate 308 supports a butterfly valve 312 for opening and closing a passage 313 from a lower cylindrical housing 314, through a flexible chute 316. The chute 316 leads to the pug mill 27. Telescopically mounted over the housing 314 and sealed by an O-ring 317 is a slightly larger housing 318 which is secured to the top plate 309. It will be seen that movement of the plates relative to each other varies the relative positions of the housings 314 and 318, thereby varying the capacity of the chamber formed thereby.

Inserted through an upper opening, surrounded by an O-ring 319, into the housings 314 and 318 is a tube 321 forming a passage 322 opened and closed by another butterfly valve 323. The valve 323 fluidly communicates with the hopper 24 through an opening 324 formed in the bottom panel 127. Communication with the atmosphere is provided by an air line 326 inserted into the upper housing 318.

The valves 312 and 323 are operable by a parallel linkage including a pair of links 327 and 328 (FIG. 15) secured at their one ends to the valves, and pivotally connected at their other ends to a bar 329. The lower end of the bar 329 is pivotally connected to the upper end of the acting piston and cylinder 36, for example, which in turn, however, is pivotally connected at 331 to the frame 20. The arrangement is such that the valves 312 and 313 are in opposite positions; and similarly to the fluid control of the measuring units 31 and 32, the valves of the two units 306 substituted therefor would be oppositely arranged. Thus, upon opening of the valve 323 with the valve 312 closed, emulsion flows from the hopper 24 through the passage 322 into the chamber formed by the housings 314 and 318, and of a quantity determined by their relative positions. When the valve 312 opens and the valve 323 closes, the measured amount of emulsion flows through the chute 316 to the pug mill 27.

Although a preferred embodiment of the machine and of one of the measuring units therefor, plus a pair of modifications of the unit, have been described hereinbefore, it is to be remembered that various other modifications and alternate constructions can be made thereto without departing from the true scope and spirit of the invention as defined in the appended claims.

We claim:

1. Apparatus for making a seal coat comprising in combination:
   a portable machine;
   a pug mill mounted on said machine;
   a first hopper for holding an aggregate mounted on said machine above said mill;
   one of more second hoppers each for holding matter mounted on said machine above said mill;
   means for receiving a quantity of matter from each hopper for transmitting a predetermined measured amount of said received matter into said mill; and
   fluid controlled means operably connected to said measuring means and operable in response to movement of said machine for selectively discharging the matter from the respective hoppers into said mill in a predetermined relationship.

2. An apparatus for making a seal coat as defined in claim 1, and further wherein said machine is self-propelled.

3. Apparatus for making a seal coat comprising in combination:
   a portable machine;
   a pug mill mounted on said machine;
   a first hopper for holding an aggregate mounted on said machine above said mill;
   one or more second hoppers each for holding matter mounted on said machine above said mill;
   means for receiving a quantity of matter from each hopper for transmitting a predetermined measured amount of said received matter into said mill;
   fluid controlled means operably connected to said measuring means for controlling the operation thereof; and
   valve means operable in response to movement of said vehicle for selectively actuating said fluid controlled means for effecting a discharge of the matter from each hopper into said mill in a predetermined sequence.

4. Apparatus for making a seal coat as defined in claim 3, and further wherein said pug mill includes an open-top container having a rotatable member extended longitudinally thereof, said member operatively connected to said fluid controlled means the operation of which is effected by actuation of said valve means.

5. Apparatus for making a seal coat comprising in combination:
   a portable machine;
   a pug mill mounted on said machine;
   a first hopper for holding an aggregate mounted on said machine above said mill;
   a second hopper for holding an emulsion mounted on said machine above said mill;
   a third hopper for holding water mounted on said machine above said mill;
   measuring means for each hopper mounted below a respective hopper and intermediate said hopper and said mill, each measuring means operable to discharge a predetermined quantity of matter from its respective hopper into said mill;
   fluid controlled means including a piston and cylinder unit operatively connected to said measuring means for controlling the operation thereof; and
   valve means operable in response to movement of said vehicle for selectively actuating said fluid control means for effecting in a timed relationship a discharge of a predetermined quantity of matter from each hopper into said mill.

6. Apparatus for making a seal coat as defined in claim 5, and further wherein said valve means includes an oscillatable cam device actuated by rotation of one of the wheels of said machine for selectively actuating said fluid controlled means for effecting in timed relationship a discharge of a predetermined quantity of matter from each hopper into said mill.

7. Apparatus for making a seal coat as defined in claim 6, and further wherein said valve means is operable by hand independent of movement of said machine.

8. In an apparatus for making a seal coat wherein a hopper for holding fluid is mounted above a mill for mixing the fluid with other material, means for transmitting the fluid to said mill in measured amounts comprising in combination:
   a housing having aligned openings in opposite upper and lower walls thereof;
   a first hollow member inserted through said openings so that the ends thereof register substantially with said openings, said ends in respective fluid communication with the hopper and the mill, said first member having one or more apertures formed therein at the lower end so as to be in fluid communication with the interior of said housing;
   a second hollow member inserted through said upper wall downwardly into the interior of said housing, the lower end of said second member spaced from the lower wall and the opposite end of said second member open to the atmosphere; and
   closure means attached to the apparatus for alternately maintaining the upper and lower first members ends open and closed, respectively, and closed and open, respectively.

9. Means for transmitting fluid as defined in claim 8, and further wherein said second member is movably connected to said upper wall for varying said spacing of the lower end thereof from said lower wall.

10. In an apparatus for making a seal coat wherein a hopper for holding a fluid is mounted above a mill for mixing the fluid with other material, means for transmitting the fluid to said mill in measured amounts comprising in combination:
   a housing having an expansible chamber formed therein by an upper and lower pair of telescopically connected cylinders, each cylinder closed at one end and open at the other, and with the open ends adjacent each other;
   said upper cylinder having an opening formed in its upper wall, and said lower cylinder having an opening formed in its lower wall and aligned with said upper wall opening;
   first valve means attached to the apparatus above said housing and fluidly communicating said upper wall opening with the hopper, and operable to open and close said upper wall opening;
   second valve means attached to said lower cylinder and fluidly communicating said lower wall opening with the mill, and operable to open and close said lower wall opening;
   means connected to the apparatus and operably connected to said first valve means and to said second valve means for operation thereof in a predetermined relation; and
   adjustable means connected to the apparatus and to one of said cylinders for moving said one cylinder telescopically toward and away from said other cylinder.

11. Means for transmitting fluid as defined in claim 10, and further wherein said first valve means includes a hollow member inserted through said upper wall opening and depending into said upper cylinder, and with said upper cylinder slidable on said member.

12. In an apparatus for making a seal coat wherein a hopper for holding a fluid is mounted above a mill for mixing the fluid with other material, means for transmitting the fluid to said mill in measured amounts comprising in combination:

a housing having aligned openings in opposite upper and lower walls thereof, the upper and lower wall openings in respective fluid communication with the hopper and the mill;

a hollow member inserted through said lower wall opening and adapted to have a lower end thereof register with said lower wall opening and an upper end thereof spaced upwardly from said lower wall, said member movable relative to said lower wall for varying the spacing of the upper end thereof from said lower wall; and closure means attached to the apparatus for alternately maintaining said upper wall opening and said member open and closed, respectively, and closed and open, respectively.

13. Means for transmitting fluid as defined in claim 12, and further wherein said hollow member has an embossment internally thereof which has a bore formed therethrough axially of the member, and further wherein said closure means includes a shaft slidably extending through said bore.

References Cited

UNITED STATES PATENTS

| | | | |
|---|---|---|---|
| 1,191,436 | 7/1916 | Kennedy | 222—453 |
| 2,826,342 | 3/1958 | Clark | 222—177 |
| 2,864,538 | 12/1958 | Rasmussen | 222—453 |
| 2,906,438 | 9/1959 | Carpenter | 222—177 |
| 3,072,302 | 1/1963 | Giovannoni et al. | 222—453 |
| 3,101,159 | 8/1963 | Fletcher | 222—453 |
| 3,206,174 | 9/1965 | Young | 94—46 X |
| 3,224,738 | 12/1965 | Tarukawa | 259—9 |
| 3,228,310 | 1/1966 | Cartwright | 94—46 X |

FOREIGN PATENTS

| | | |
|---|---|---|
| 142,458 | 7/1951 | Australia. |
| 240,544 | 10/1925 | Great Britain. |

JACOB L. NACKENOFF, *Primary Examiner.*